Patented Oct. 21, 1941

2,260,006

UNITED STATES PATENT OFFICE 2,260,006

CONDENSATION PRODUCT OF A PHENOL, AN ALIPHATIC ALDEHYDE, AND A PARTLY AMIDATED POLYCARBOXYLIC ACID

Gaetano F. D'Alelio, Pittsfield, Mass., assignor to General Electric Company, a corporation of New York No Drawing. Application March 26, 1940, Serial No. 326,056

16 Claims. (Cl. 260—45)

This invention relates to new condensation products. More particularly it is concerned with condensation products of ingredients comprising a phenol, an aliphatic aldehyde and a derivative of a polycarboxylic acid containing at least three carbon atoms, more particularly a derivative of such an acid containing at least one —COOH radical and at least one amidated carboxylic radical having at least one hydrogen atom attached directly to the amide nitrogen. Examples of such amide radicals are

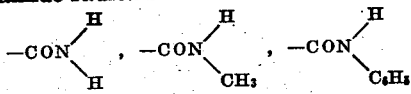

etc. For purpose of brevity these amide derivatives of polycarboxylic acids are designated generally herein as "semi-amides of polycarboxylic acids containing at least three carbon atoms" or, merely, as "semi-amides."

The present application is a continuation-in-part of my copending application Serial No. 169,465, filed October 16, 1937, Patent No. 2,239,440, Serial No. 289,435, filed August 10, 1939, and Serial No. 318,956, filed February 14, 1940.

In application Serial No. 169,465 I disclosed and claimed resinous compositions prepared by reacting an aliphatic aldehyde, specifically formaldehyde, with an organic compound having the general structure,

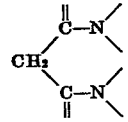

more particularly compounds such as malonic diamide, methylene cyanide, cyanoacetamide, etc. During the reaction methylol and methylene derivatives are formed as intermediate products. I also showed that these methylol and methylene derivatives not only were resin-forming in themselves but that certain advantages accrued when they were intercondensed with other bodies, for example phenols and aliphatic aldehydes.

In my copending application Serial No. 289,435 I pointed out the advantages of using as a resin-forming reactant a polyamide initially containing a methylene grouping attached to a carbon atom. More particularly I disclosed and claimed in that application condensation products of an aliphatic aldehyde and an amide of an unsaturated polycarboxylic acid containing a $$CH_2=C\Big\langle$$

grouping and in which the carboxyl groups are attached to different carbon atoms. A typical example of such amides, which may be termed "vinyl polyamides," is itaconic diamide. I also showed in that application that particularly valuable resinous compositions could be produced by intercondensing an aliphatic aldehyde and a vinyl polyamide with at least one other aliphatic aldehyde-reactable organic compound capable of forming a methylol derivative as an intermediate during the resin formation, for example, urea, phenols, acetone, etc. I pointed out that when vinyl polyamides are intercondensed with, for example, phenol and formaldehyde the introduction of the vinyl polyamide into the resin molecule yields light-colored resins and imparts light stability thereto.

In application Serial No. 318,956 I disclosed and claimed intercondensation products of maleic diamide, an aliphatic aldehyde and a methylol-forming organic compound, e. g., urea, phenols, etc. I showed in that application that the incorporation of maleic diamide into a phenol-aliphatic aldehyde resin molecule improves the color and the light stability of the phenolic resin in much the same way as malonic diamide and itaconic diamide cause such improvement.

The present invention is based on my discovery that compositions of commercial importance, particularly in the plastics and coating arts as casting resins, oil-soluble resins, molding compositions, etc., are obtained by intercondensing a phenol, an aliphatic aldehyde and a derivative of a polycarboxylic acid containing at least three carbon atoms, which derivative contains at least one —COOH radical and at least one aldehyde-reactable amide radical. Illustrative of such amide radicals are those which may be represented by the formula $$-CON\Big\langle{H \atop R}$$

where R represents hydrogen, or alkyl, aryl, aralkyl, alkaryl, acyl, naphthyl, hydrocyclic, heterocyclic, etc., radicals, or nitro, halogeno, aceto, carbalkoxy, acetoxy, etc., derivatives of such radicals.

Specific examples of semi-amides of polycarboxylic acids (dicarboxylic acids, tricarboxylic acids, etc.) containing more than two carbon atoms which may be used in carrying the present invention into effect are malonic monoacid monoamide, succinic monoacid monoamide, itaconic monoacid monoamide, maleic monoacid monoamide, adipic monoacid N-methyl monoamide, maleic monoacid N-phenyl monoamide, fumaric monoacid N-furfuryl monoamide, tartaric monoacid N-ethyl monoamide, phthalic monoacid N-cresyl monoamide, monoacid polyamides of polycarboxylic acids containing at least three carboxyl groups, e. g., citric monoacid diamide, aconitic monoacid diamide, tricarballylic monoacid diamide, etc., polyacid monoamides of polycarboxylic acids containing at least three carboxyl groups, e. g., citric diacid monoamide, aconitic diacid monoamide, tricarballylic diacid monoamide, etc.

It was surprisingly found that when a phenol and an aliphatic aldehyde are intercondensed with an acid (—COOH) amide of a polycarboxylic acid containing at least three carbon atoms, products of improved color and light stability are obtained. Further, the introduction of the —COOH radical facilitates the conversion of the intermediate condensation product from a soluble, fusible state to an insoluble, infusible state. These results were quite unexpected, since it could not be predicted from the known properties of polycarboxylic acids and polyamides of such acids that the introduction of an amide radical and, also, a —COOH radical into a phenol-aliphatic aldehyde condensation product, with a single reactant, would improve the color of the end-product and, in addition, facilitate the conversion of the potentially reactive resin to a cured (insoluble and infusible) state. Another advantage accruing from my invention resides in the simplicity with which casting resins adapted to be hardened under heat (e. g., at temperatures of the order of about 60° to 130° C.) can be produced.

I am aware that the broad suggestion has been made heretofore that resinous compositions may be obtained by condensing formaldehyde or its polymers with polyamides of polycarboxylic acids, more particularly those containing more than four carbon atoms, e. g., polyamides of adipic acid, suberic acid, phthalic acid, etc. However, to the best of my knowledge and belief, resinous compositions heretofore have not been produced by condensing an aliphatic aldehyde with a monoacid monoamide or polyamide, or with a polyacid monoamide, of a polycarboxylic acid containing at least three carbon atoms. Likewise, to the best of my knowledge and belief, it was not known or appreciated prior to my invention that particularly useful, relatively inexpensive resins of good color and color stability could be obtained by intercondensing a phenol, an aliphatic aldehyde and the above-described semi-amides; or, by intercondensing such semi-amide (or a partial condensation product, e. g., a methylol derivative, of such semi-amide and an aliphatic aldehyde, e. g., formaldehyde) with a partial condensation product, e. g., a methylol derivative, of a phenol and an aliphatic aldehyde.

In carrying the present invention into effect I prefer to use an acid amide containing at least one —COOH radical and at least one —CONH$_2$ radical. The condensation between the reactants may be carried out under acid, alkaline or neutral conditions. Any substance or catalyst which has an acid or an alkaline nature may be used to obtain the acid, alkaline or neutral condition under which the reactants are intercondensed. For example, I may use ammonia, calcium hydroxide, sodium and potassium hydroxides, methyl amine, diethyl amine, tri-isopropyl amine, ethanol amine, tri-iso-propanol amine, etc.; mixtures of such alkaline substances; inorganic and organic acids such as hydrochloric, sulfuric, phosphoric, acetic, acrylic, crotonic, malonic, etc.; mixtures of such acids; acid salts such as sodium acid sulfate, monosodium phosphate, monosodium phthalate, etc.; mixtures of acid salts; basic salts such as ammonium carbonate, sodium and potassium carbonates, sodium acetate, etc.; and mixtures of basic salts.

I may condense the components used in practicing this invention under various conditions. For example, all the components may be mixed together and the reaction caused to proceed under acid, alkaline or neutral conditions. Or, I may effect partial condensation between an aliphatic aldehyde and a phenol, then add the semi-amide and effect further condensation. Or, I may first partially condense the semi-amide with an aliphatic aldehyde under acid, alkaline or neutral conditions and then add a phenol and effect further condensation. Or, I may separately partially condense (1) a phenol and an aliphatic aldehyde and (2) a semi-amide and an aliphatic aldehyde, thereafter mixing the two products of partial condensation and effecting further condensation therebetween. The reactants of (1) and of (2) initially may be condensed under acid, alkaline or neutral conditions.

In effecting reaction between the aliphatic aldehyde and the semi-amide, various mol ratios of reactants may be employed as desired or as conditions may require, but the proportions usually are within the range of ¾ to 6 mols aliphatic aldehyde for each mol of the semi-amide. Preferably I use approximately 1 to 4½ mols aliphatic aldehyde per mol of the semi-amide. The resulting methylol or methylene derivatives then may be condensed with a phenol or with a partial condensation product, e. g., a methylol derivative, of a phenol and an aliphatic aldehyde. In preparing such partial condensation products of a phenol and an aliphatic aldehyde, the mol ratios of reactants may be varied as desired or as conditions may require, but usually the proportions are within the range of ¾ to 6 mols of the aliphatic aldehyde for each mol of the phenolic body, for example from 1 to 4½ mols of the former for each mol of the latter.

The ratio of the total molar amount of phenolic body and semi-amide to aliphatic aldehyde may vary considerably, depending upon the particular starting reactants, the conditions of reaction and the particular properties desired in the end-product, but generally is within the range of ¾ to 6 mols aliphatic aldehyde for each mol of total phenol and semi-amide (that is, 1½ to 12 mols aliphatic aldehyde for each two mols of total phenol and semi-amide). Mainly for economic reasons I prefer to use not exceeding substantially 0.5 mol of the semi-amide for each mol of the phenolic body.

In the production of casting resins adapted to be hardened under heat it is advantageous to effect reaction between (1) not exceeding substantially 0.5 mol of the semi-amide and (2) an alkaline-catalyzed partial condensation product of one mol phenol and a molar amount of an aliphatic aldehyde (e. g., paraformaldehyde or an aqueous solution of formaldehyde) exceeding the sum of the molar amounts of phenol and semi-amide. Thus, in the preparation of casting resins, optimum results usually are obtained when the proportions of reactants are of the order of 1½ mols total phenol and semi-amide to 2 to 7 mols or more of aliphatic aldehyde, specifically formaldehyde or the like. Casting resins which harden relatively rapidly to an insoluble infusible state at an elevated temperature, e. g., at 80° to 110° C., are obtained with 3 or 4 to 7 or more mols formaldehyde for each mol of total phenol and semi-amide.

In producing the new condensation products of this invention, the reaction between the components may proceed under a wide variety of time, pressure and temperature conditions. The temperature of reaction may vary from room temperature to the reflux temperature of the reactants at reduced, atmospheric or superatmospheric pressures. In some cases it is desirable to initiate the reaction between the components at a pH above 7.0 and to complete the reaction at a pH below 7.0.

Depending upon the particular reactants employed and the particular conditions of reaction, the intermediate (potentially reactive) condensation products vary from clear, almost colorless, syrupy, water-soluble liquids to gel-like masses or semi-solid bodies of decreased solubility in ordinary solvents such as alcohol, glycol, glycerol, water, etc. The liquid intermediate condensation products may be concentrated or diluted further by the addition or removal of volatile solvents to form liquid coating compositions of adjusted viscosity and concentration. These liquid compositions may be used, for instance, as surface coating materials, in the production of paints, varnishes, lacquers, enamels, etc., for general adhesive applications, in producing laminated articles, and for numerous other purposes. The liquid intermediate products may be used alone, or mixed with fillers, pigments, dyes, lubricants, etc., in the production of molding compositions. Also, these intermediate products may be dried and granulated to form clear, unfilled, heat-convertible resins.

In order that those skilled in the art better may understand how the present invention may be carried into effect, the following examples are given by way of illustration. All parts are by weight.

Example 1

| | Parts |
|---|---|
| Phenol | 94.0 |
| Aqueous solution of formaldehyde (approximately 37.1% HCHO) | 161.0 |
| Sodium hydroxide in 25 parts water | 1.5 |
| Citric monoacid diamide dispersed in 100 parts water | 7.3 |

All of the above components with the exception of the citric monoacid diamide were mixed and refluxed for 55 minutes, after which the water dispersion of diamide was added. The diamide immediately reacted with the phenol-aldehyde partial condensation product. The resulting mass was faintly opalescent when hot. On cooling slightly the intercondensation product precipitated from the acqueous solution. The reaction mass was dehydrated under a vacuum of 24 inches mercury to a resin temperature of 75° C. The liquid, dehydrated, heat-convertible product was cast and hardened by heating for 72 hours at about 70° C. A very hard, ivory-white resinous intercondensation product was obtained.

The dehydrated, potentially reactive resinous mass may be dissolved in a suitable solvent, for example a mixture of acetone and alcohol, and used as a laminating varnish for the production of light-colored laminated products, e. g., wood veneer products.

When the citric monoacid diamide is omitted from the above formulation, but with other reactants, proportions and technique the same, a brittle, bubbly, dark-colored dehydrated product is obtained.

Example 2

Same reactants and proportions as in Example 1 with the exception that 6 parts by weight of an alkylene oxide, specifically a polyethylene oxide having a molecular weight of at least 400 and, more particularly, about 1500 was added to the phenol-aldehyde-citric monoacid diamide intercondensation product prior to dehydration. The resulting mass was dehydrated as described under Example 1. During dehydration, the polyethylene oxide reacted with the phenol-aldehyde-diamide condensation product. The dehydrated resinous mass was cast and hardened as described in the previous example, yielding a hard, tough, water-resistant, ivory-white product which was readily machinable.

Example 3

To the dehydrated resin of Example 1 there was added 6 parts glycerine and the resulting product heat-hardened as in Example 1. The cured resin was a little more brittle, that is, not quite so tough, as the cured resin of Example 2. Otherwise, the properties of the resins of Examples 2 and 3 were much the same.

Example 4

| | Parts |
|---|---|
| Undehydrated resin syrup of Example 1 | 150 |
| Alpha cellulose | 82 |
| Zinc stearate | 2 |
| Lithopone | 1 |
| Polyethylene oxide having a molecular weight of about 4000 | 1 |
| Dye (blue) | trace | were mixed and dried at 65° to 70° C. in an oven for about 1 hour or until dry to the touch. The dried mass was molded in the form of a disk at approximately 130° C. under a pressure of about 2500 pounds per square inch. The molded article showed good plasticity of the mass during molding, had a good surface appearance, was hard and mechanically strong and, in general, showed properties such as to adapt the material for a wide variety of service applications.

Example 5

| | Parts |
|---|---|
| Phenol | 100 |
| Aqueous solution of formaldehyde (approximately 37.1% HCHO) | 100 |
| Citric monoacid diamide | 2 |

The above components were refluxed together for two hours at the boiling temperature of the mass (approximately 94° to 98° C.), resulting in a separation into two phases. The reaction mass was dehydrated to a hard, solid, potentially reactive (soluble, fusible) resin. This resin was convertible under heat to an insoluble, infusible state by the addition of the usual hardening agents for potentially reactive phenolic resins, e. g., hexamethylenetetramine, calcium oxide, etc.

It will be understood, of course, by those skilled in the art that the present invention is not limited to the use of the specific components named in the above illustrative examples. Thus, instead of formaldehyde other compounds engendering formaldehyde may be employed, for example paraformaldehyde, hexamethylene-tetramine, etc. Other aliphatic aldehydes also may be used, the particular aldehyde depending upon economic considerations and the particular properties desired in the end-product. For instance, in certain cases I may use acetaldehyde, propionaldehyde, butyraldehyde, acrolein, methacrolein, crotonaldehyde, etc., mixtures thereof, or mixtures of formaldehyde or compounds engendering formaldehyde with such aliphatic aldehydes.

Likewise, substances other than phenol itself may be employed. For instance, I may use other reactive phenolic bodies such as ortho, meta and para cresols, ortho, meta and para chlorphenol, meta nitro phenol, p,p'-dihydroxy diphenyl propane, catechol, resorcinol, the xylenols, meta ethyl phenol, para tertiary butyl phenol, para tertiary amyl phenol, the ortho, meta and para phenyl phenols, the ortho, meta and para benzyl phenols, phenyl phenol ethane, etc., or mixtures of such aldehyde-reactable phenolic bodies.

The new intercondensation products of this invention in which the phenol is an ortho- or para-substituted phenol containing three or more carbon atoms in the substituent grouping are soluble in oils, as for example drying and semi-drying oils, and in such form, with or without further heat treatment of the oily solution of the resinous condensation product, may be used in the production of coating compositions such as varnishes, enamels, lacquers, etc. Examples of substituted phenols yielding oil-soluble intercondensation products are the ortho- and para-substituted butyl phenols, amyl phenols, indene phenols, hydroxybenzofuranes, phenyl phenols, 2-ethyl hexyl phenols, terpene phenols, symmetrical phenyl phenol alkanes, styryl phenols, the nuclearly alkylated styrene phenols, the nuclearly alkylated phenyl, phenol alkanes, the nuclearly phenylated phenyl, phenol alkanes, etc.; or, in general, an ortho- or a para-substituted phenol having two reactive positions in the aromatic nucleus and containing at least three carbon atoms in the substituent grouping. The term "a phenol" as used generally herein and in the appended claims therefore is intended to include within its meaning not only phenol (C₆H₅OH) itself, but also homologues and derivatives of phenol.

Also, instead of citric monoacid diamide, I may use citric diacid monoamide or any other derivative of a polycarboxylic acid containing at least three carbon atoms, which derivative contains at least one —COOH radical and at least one aldehyde-reactable amide radical, that is, an amide radical containing at least one hydrogen atom attached directly to the amide nitrogen. Examples of such semi-amides, in addition to those previously mentioned, are the monoamides of the saturated aliphatic polycarboxylic acids containing at least three carbon atoms, e. g., adipic, glutaric, pimelic, sebacic, azelaic, suberic, tricarballylic, malic, tartaric, citric, etc.; the monoamides of the cyclic polycarboxylic acids, more specifically the saturated cycloaliphatic polycarboxylic acids such as the cyclopropane dicarboxylic acids, the cyclohexane dicarboxylic acids, the alkyl cycloalkane polycarboxylic acids, etc.; the monoamides of the halogenated and non-halogenated aromatic polycarboxylic acids, e. g., halogenated and non-halogenated phthalic, benzoyl phthalic, terephthalic, benzophenone-2,4' dicarboxylic acids, etc.; the monoamides of the alpha unsaturated alpha beta polycarboxylic acids, e. g., maleic, monohalomaleic, fumaric, monohalofumaric, citraconic, mesaconic, acetylene dicarboxylic, aconitic, itaconic and its homologues as, for instance, alpha methyl itaconic acid, alpha ethyl itaconic acid, alpha alpha dimethyl itaconic acid, etc.

More specific examples of the semi-amides which may be used in carrying the present invention into effect are the monoacid N-methyl, -ethyl, -propyl, -butyl, -isobutyl, -hexyl, -phenyl, -benzyl, -cinnamyl, -naphthyl, -cresyl, -furfuryl, -allyl, -methallyl, -crotonyl, -cyclohexyl, -aceto, etc., monoamides of malonic, succinic, adipic, maleic, fumaric and other saturated and unsaturated polycarboxylic acids containing at least three carbon atoms, numerous examples of which were given above. Thus I may use any monoacid N-alkyl, -aryl, -aralkyl, -alkaryl, -acyl, -naphthyl, -hydrocyclic or -heterocyclic (or a nitro, halogeno, aceto, carbalkoxy or acetoxy derivative of the said radicals) monoamide of any polycarboxylic acid containing at least three carbon atoms. For example, I may use a monoacid monoamide of an unsaturated polycarboxylic acid containing a

grouping and in which the carboxylic groups are attached to different carbon atoms. Illustrative examples of such monoacid monoamides are methyl-itaconic monoacid monoamide, diethyl-itaconic monoacid monoamide, diphenyl-itaconic monoacid monoamide, vinyl-itaconic monoacid monoamide, allyl-itaconic monoacid monoamide, aceto-itaconic monoacid monoamide, methacrylo-itaconic monoacid monoamide, benzyl-itaconic monoacid monoamide, itaconic monoacid N-furfuryl monoamide, itaconic monoacid N-naphthyl monoamide, methylene-adipic monoacid monoamide, methylene-sebacic monoacid monoamide, itaconic monoacid N-methyl monoamide, itaconic monoacid N-phenyl monoamide, itaconic monoacid N-allyl monoamide, phenyl-itaconic monoacid N-phenyl monoamide, fulgenic monoacid monoamide, fulgenic monoacid N-methyl monoamide, itaconic monoacid N-aceto monoamide, itaconic monoacid N-crotonyl monoamide, itaconic monoacid N-cyclohexyl monoamide, methylene-azelaic monoacid monoamide, methylene-azelaic monoacid N-methyl monoamide, methylene-azelaic monoacid N-phenyl monoamide, etc. (Formulas for the diamides of these unsaturated polycarboxylic acids are given in my copending application Serial No. 289,435.)

If desired, the fundamental resins of this invention may be modified by introducing other bodies before, during or after condensation between the primary components. These modifying substances may or may not have resinous characteristics and may be, for example, partially hydrolyzed wood products, lignin, proteins, protein-aldehyde condensation products, urea-aldehyde condensation products, aniline-aldehyde condensation products, furfural condensation products, modified or unmodified, saturated or unsaturated polyhydric alcohol-polycarboxylic acid reaction products, sulfonamide-aldehyde resins, water-soluble cellulose derivatives, natural gums and resins such as copal; shellac, rosin, etc., polyvinyl compounds such as polyvinyl alcohol, polyvinyl acetate, polyvinyl acetals, specifically polyvinyl formal, etc.

Dyes, pigments, hardening agents, and opacifiers (e. g. barium sulfate, zinc sulfide, titanium compounds such as the oxides, flaked aluminum, copper and the like, may be incorporated into the compositions of this invention to alter the visual appearance and the optical properties of the finished product. Mold lubricants such as the metallic soaps of the high molecular weight fatty acids, for example the stearates and palmitates of tin, zinc, etc., waxes such as carnauba, high melting point paraffin waxes, etc., may be added to facilitate molding of the compositions. Various fillers may be used to provide a wide variety of molding compounds. The choice of the filler depends upon the particular application for which the molded article is to be used. As fillers may be used, for instance, bleached or unbleached wood flour, alpha cellulose, sheets or cuttings of paper, cloth, canvas, etc., asbestos in powdered or long or short fiber length, powdered or flake mica, wood chips, short or long wood fibers, synthetic or natural continuous threaded fibers, glass fibers in continuous filament or fabric (woven or felted) form, etc. In producing light-colored molded articles of manufacture, I preferably incorporate into the molding composition a white or substantially white filler, e. g., alpha cellulose, etc.

In preparing molding compositions from the heat-convertible resinous bodies of this invention, the non-dehydrated or the partially dehydrated resins may be compounded with the above addition agents in accordance with procedures well known to those skilled in the art. The molding compositions may be molded at elevated temperatures, e. g., between 100° and 175° C., usually at around 125° to 150° C., and at suitable pressures. The molding pressures generally range between about 1000 and about 4000 pounds per square inch, more particularly from about 2000 to 3000 pounds per square inch.

The modified and unmodified products of this invention have a wide variety of uses, for instance in making buttons, clock cases, radio cabinets, meter cases and other parts of electrical equipment, decorative novelties and various other cast, molded and laminated articles of manufacture. They may be used in making laminated fibrous sheet materials wherein superposed layers of cloth, paper, etc., are firmly bonded together with the resin, in the manufacture of arc-extinguishing tubes, as bonding agents for mica flakes in producing laminated mica articles, in preparing baking varnishes and enamels, as impregnants for electrical coils and other electrical devices, and for other purposes.

What I claim as new and desire to secure by Letters Patent of the United States is:

1. A composition comprising a resinous product of reaction of ingredients comprising a phenol, an aliphatic aldehyde and a derivative of a polycarboxylic acid containing at least three carbon atoms, said derivative containing at least one —COOH radical and at least one amidated carboxylic radical having at least one hydrogen atom attached directly to the amide nitrogen.

2. A composition comprising a potentially reactive resinous condensation product of a phenol, formaldehyde and a derivative of a polycarboxylic acid containing at least three carbon atoms, said derivative containing at least one —COOH radical and at least one amidated carboxylic radical having at least one hydrogen atom attached directly to the amide nitrogen.

3. A resinous composition comprising the product of reaction of ingredients comprising a phenol, an aliphatic aldehyde and a derivative of a polycarboxylic acid containing at least three carbon atoms, said derivative containing at least one —COOH radical and at least one —CONH$_2$ radical.

4. A resinous composition comprising the product of reaction of a phenol, formaldehyde and a monoacid monoamide of a dicarboxylic acid containing more than two carbon atoms.

5. A composition comprising a resinous condensation product of a phenol, formaldehyde and a monoacid polyamide of a polycarboxylic acid containing at least three carboxyl groups.

6. A composition comprising a resinous condensation product of a phenol, formaldehyde and a polyacid monoamide of a polycarboxylic acid containing at least three carboxyl groups.

7. A composition comprising the resinous product of reaction of (1) a derivative of a polycarboxylic acid containing at least three carbon atoms, said derivative containing at least one —COOH radical and at least one amidated carboxylic radical having at least one hydrogen atom attached directly to an amide nitrogen, with (2) an alkaline-catalyzed partial condensation produce of a phenol and an aliphatic aldehyde.

8. A composition as in claim 7 wherein the aliphatic aldehyde reactant is formaldehyde.

9. A composition comprising the resinous product of reaction of a partial condensation product of formaldehyde and a phenol with a partial condensation product of formaldehyde and an acid monoamide of a polycarboxylic acid containing at least three carbon atoms.

10. An oil-soluble resinous composition comprising the product of reaction of ingredients comprising (1) an aliphatic aldehyde, (2) a substituted phenol selected from the class consisting of ortho- and para-substituted phenols having at least two reactive positions in the aromatic nucleus and containing at least three carbon atoms in the substituent grouping, and (3) a derivative of a polycarboxylic acid containing at least three carbon atoms, said derivative containing at least one —COOH radical and at least one amidated carboxylic radical having at least one hydrogen atom attached directly to the amide nitrogen.

11. A heat-convertible resinous composition comprising a soluble, fusible, resinous reaction product of a phenol, formaldehyde and a derivative of a polycarboxylic acid containing at least three carbon atoms, said derivative containing at least one —COOH radical and at least one —CONH$_2$ radical.

12. A product comprising the insoluble and infusible resinous composition of claim 11.

13. A casting resin adapted to be hardened under heat, said resin comprising the dehydrated, liquid condensation product of (1) not exceeding substantially 0.5 mol of a derivative of a polycarboxylic acid containing at least three carbon atoms, said derivative containing at least one —COOH radical and at least one —CONH₂ radical, with (2) an alkaline-catalyzed partial condensation product of one mol phenol and an aqueous solution of formaldehyde in a molar amount exceeding the sum of the molar amounts of phenol and the said polycarboxylic acid derivative.

14. A resinous composition comprising the product of reaction of citric monoacid diamide, phenol and formaldehyde.

15. A resinous composition comprising the product of reaction of maleic monoacid monoamide, phenol and formaldehyde.

16. The method of producing a resinous composition which comprises causing to react to resin formation ingredients comprising a phenol, an aliphatic aldehyde and a derivative of a polycarboxylic acid containing at least three carbon atoms, said derivative containing at least one —COOH radical and at least one amidated carboxylic radical having at least one hydrogen atom attached directly to the amide nitrogen.

GAETANO F. D'ALELIO.